United States Patent [19]
Sadri et al.

[11] Patent Number: 5,760,696
[45] Date of Patent: Jun. 2, 1998

[54] DISCRIMINATING EARTHQUAKE DETECTOR

[75] Inventors: Afshin Sadri, Montreal; Sami Guindi, St. Lambert; Robert Heidt, Kirkland, all of Canada

[73] Assignee: Tectonics Research Group Inc., St-Lambert, Canada

[21] Appl. No.: 705,543

[22] Filed: Aug. 29, 1996

[51] Int. Cl.[6] .................................. G08B 21/00
[52] U.S. Cl. .................. 340/690; 340/540; 340/686; 340/689
[58] Field of Search .................. 340/540, 686, 340/689, 690

[56] References Cited

U.S. PATENT DOCUMENTS

| | | | |
|---|---|---|---|
| 3,506,957 | 4/1970 | Davison | 340/15.5 |
| 3,691,549 | 9/1972 | Wilson | 340/261 |
| 3,984,803 | 10/1976 | Hawk et al. | 340/16 R |
| 4,271,407 | 6/1981 | Kehrman et al. | 340/690 |
| 4,300,135 | 11/1981 | Korn et al. | 340/690 |
| 4,408,196 | 10/1983 | Freeman | 340/690 |
| 4,473,768 | 9/1984 | Kerr | 310/329 |
| 4,616,320 | 10/1986 | Kerr et al. | 364/421 |
| 4,649,524 | 3/1987 | Vance | 367/13 |
| 4,689,997 | 9/1987 | Windisch | 73/652 |
| 4,764,762 | 8/1988 | Almour | 340/690 |
| 4,849,947 | 7/1989 | Baule et al. | 367/178 |
| 5,001,466 | 3/1991 | Orlinsky et al. | 340/690 |
| 5,101,195 | 3/1992 | Caillat et al. | 340/690 |
| 5,563,575 | 10/1996 | Yamamura et al. | 340/690 |

*Primary Examiner*—Jeffery Hofsass
*Assistant Examiner*—Daniel J. Wu
*Attorney, Agent, or Firm*—Ian Fincham; McFadden, Fincham

[57] ABSTRACT

An apparatus and method for discriminating between conventional earth tremors and those which are precursors to an earthquake are provided. The method involves detecting vibration signals indicative of an earthquake. The method provides a structural vibration detecting means for detecting vibration signals in a structure responsive to vibration of a substrate upon which the structure is mounted. The detecting means is mounted to a structure. The vibration signal of the structure, e.g. the vibrations received by the wall, is determined. Any extraneous vibration signal different from the vibration signal of the structure are compared. If the extraneous signal is within a predetermined alarm signal level, the apparatus is actuated to indicate that an earthquake is imminent. The apparatus involves the use of a detector, an amplifier for amplifying the received signal, and a comparator for determining whether a received amplified signal is an earthquake signal. A signal adjustment arrangement is provided in the apparatus so that extraneous signals outside a certain range can be effectively eliminated. An alarm is activated in the event that an earthquake signal within a predetermined level is detected. This apparatus and method are significantly improved over existing arrangements in that the arrangement compares signals and only after a received signal is within a predetermined value is the apparatus activated.

2 Claims, 3 Drawing Sheets

DISCRIMINATING EARTHQUAKE DETECTOR

FIELD OF THE INVENTION

The present invention relates to a detector suitable for detecting earthquakes and more particularly, the present invention relates to a detector for discriminating between general earth tremors and tremors which are precursors to an earthquake.

BACKGROUND OF THE INVENTION

It is well documented that earthquakes have characteristic wave forms and vibration characteristics which are particularly useful for identifying earth quake calibre vibrations from simple random vibrations which are typically encountered in earth formations. Typically, an earthquake tremor results in the propagation of P- (primus) waves, which are propagated as compression and rarefaction and as well involve S-waves (secundus), which waves propagate an orthogonal angle to the direction of the wave. Generally speaking, the P-waves have a natural frequency of approximately 5 Hertz (Hz) while S-waves travel at a frequency of significantly less than the P-waves. The S-waves have a significantly larger amplitude than the P-waves and therefore are the waves that are principally involved in the destruction to structures.

One of the primary difficulties in earthquake detection relates to the time factor involved in detecting the P-waves. As will be realized, if P-waves can be detected as early as possible, this provides time for evacuation etc., of a building or area in order to avoid potential human injury caused by the arrival of S-waves which, as indicated above, are the chief destructive waves transmitted by geological formations.

The art has previously proposed various detectors and other arrangements to portend the waves, however, in existing arrangements, one of the primary difficulties is providing apparati which have sensitivity sufficient to detect P-waves at a distance from the epicenter of an earthquake without incurring horrendous costs. A further difficulty has been encountered in that there is often difficulty resolving false alarms with a real earthquake to interference in the instrumentation by extraneous vibrations or other frequencies.

Typical of the art that has been patented in this field includes U.S. Pat. No. 4,689,997, issued Sep. 1, 1987 to Windisch. The reference provides a detector which primarily employs a vertical spring barb mounted on a support. A coupler is supported on the other end of the barb and this coupler is connected through a coil spring to a mass positioned in concentricity with the barb and coupler. The spring and mass components are selected to have a natural resonant frequency corresponding to that of an earthquake tremor or other vibration to be detected. A switching circuit is provided to detonate an alarm once the earthquake frequency is detected. Windisch does not provide an integrated circuit mechanism for detection of earth tremors, but rather relies on a mechanical arrangement in the form of a spring and mass system. As is known, such systems are susceptible to temperature fluctuations which can therefore alter the point at which the apparatus can detect the earthquake frequency. Further, the Windisch arrangement does not appear to provide a system which discriminates between simple extraneous vibration and earthquake calibre frequencies.

Caillat et al., in U.S. Pat. No. 5,101,195, issued Mar. 31, 1992, provides a discriminating earthquake detector. The arrangement relies on an electromechanical arrangement having a cantilevered device with a predetermined mass on one end. During movement of the beam, an electrical signal is generated which, in turn, is useful for detection of P- and S-waves. Similar to the above-mentioned detectors in the prior art, the arrangement provided in this reference would appear to have limited utility in that there is no provision for a comparison between earthquake calibre waves and those which are simply extraneous, such as would be encountered in traffic vibration, mechanical vibration in a building, aircraft vibration, etc.

U.S. Pat. No. 5,001,466, issued Mar. 19, 1991 to Orlinsky et al., provides an earthquake detector employing an electrically conductive liquid switch means among other variations thereof.

In view of what has been previously proposed in the art, it is clear that there exists a need for a more sophisticated earthquake detector which is discriminatory between extraneous vibration and earthquake level vibration which is not limited in sensitivity.

SUMMARY OF THE INVENTION

One object of the present invention is to provide an improved discriminatory earthquake detector.

Another object of the present invention is to provide a method of detecting vibration signals indicative of an earthquake, comprising the steps of:

providing a structural vibration detecting means for detecting vibration signals in a structure responsive to vibration of a substrate upon which the structure is mounted;

mounting the detecting means to the structure;

determining the vibration signal of the structure;

comparing any extraneous vibration signal different from the vibration signal of the structure;

determining whether the extraneous signal is within a predetermined earthquake signal level; and detecting an earthquake signal.

A further object of the present invention is to provide a detector for detecting vibration signals of a structure positioned on a substrate, comprising:

detector means for detecting a predetermined vibration signal of the structure and an extraneous signal different from the vibration signal;

amplifier means for amplifying the signal;

comparator means for comparing an extraneous signal with the predetermined vibration signal of the structure;

signal adjustment means for adjusting the detector means to different vibration signals of a structure; and selectively actuable alarm means connected to the comparator means, the alarm means capable of actuation when the extraneous signal is within the predetermined vibration signal.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE DRAWINGS

Figure 1:
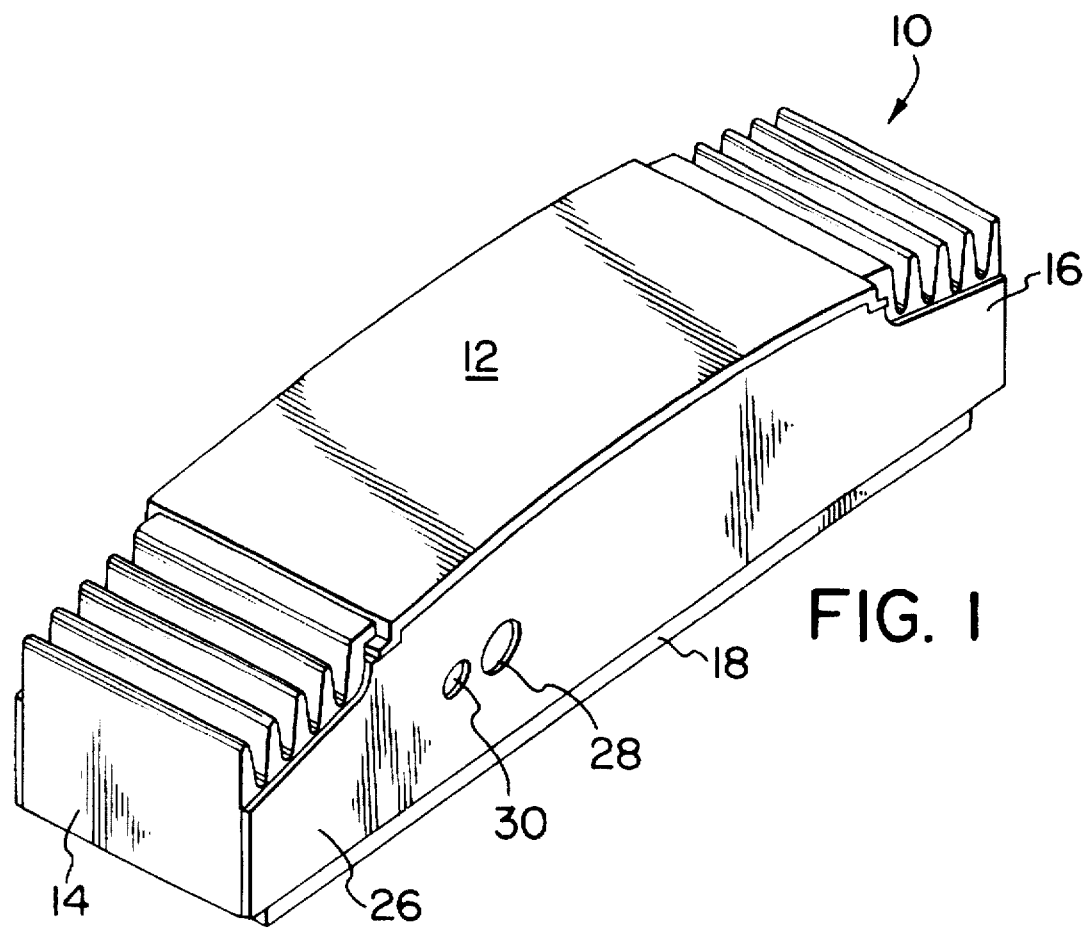
FIG. 1 is a perspective view of the apparatus according to one embodiment.
Figure 3A:
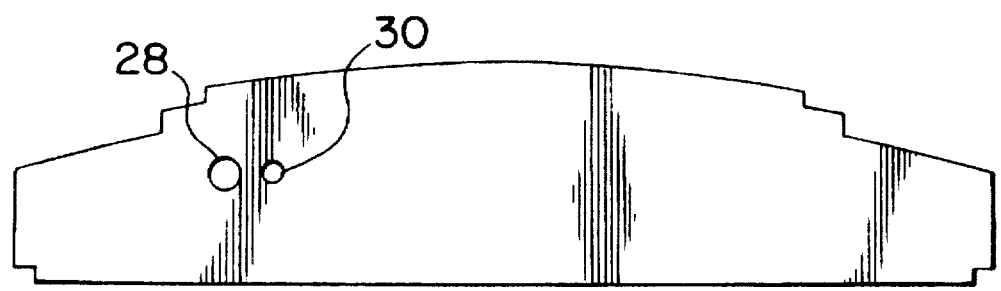
FIG. 3a is a top plan view of the top mounting plate of the apparatus.
Figure 3B:
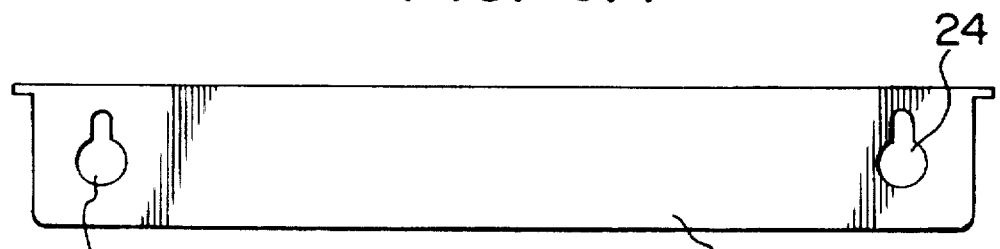
FIG. 3b is a bottom plan view of the mounting bracket.

Referring now to the drawings, FIG. 1 is one possible embodiment of the discrete earthquake alarm, broadly denoted by numeral 10. The apparatus includes a front face 12 with opposed ends 14 and 16 and a rear face 18. A top mounting plate shown in plan view in FIG. 3b, is provided with two spaced apart eyelets 22 and 24 for mounting the apparatus 10 to a substrate such as a building etc. (not shown). A bottom plate 26 is provided with two apertures 28 and 30. Aperture 28 receives a reset button (not shown) in order to reset the circuit discussed hereinafter. Aperture 30 receives a light emitting diode (LED) (not shown), the purpose of which will be discussed hereinafter.

Figure 2:
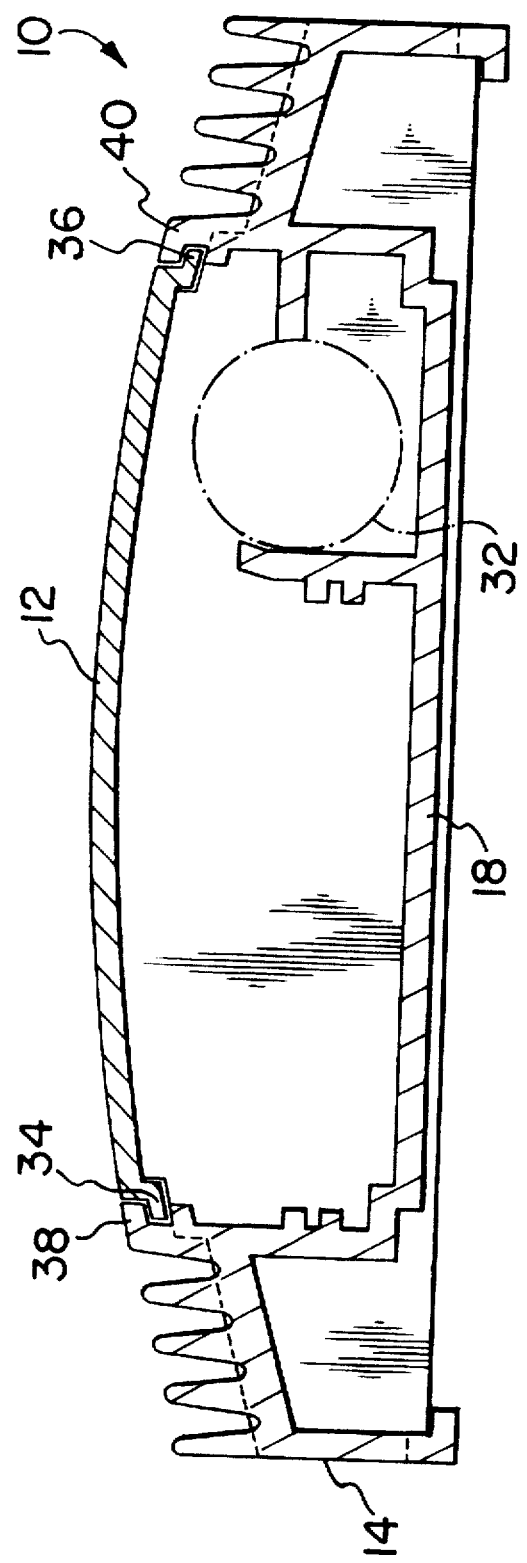
FIG. 2 is a longitudinal cross-section of the apparatus of FIG. 1.

FIG. 2 illustrates a longitudinal cross-section of the apparatus 10 in which a Piezoelectric alarm element is shown in chain line, the element being denoted by numeral 32. Piezoelectric 32 is designed to produce an audible signal once the apparatus is activated indicating an earthquake is imminent. Front face 12, as illustrated in FIG. 2, includes lips 34 and 36, which are received within cooperating recesses 38 and 40, respectively on the apparatus 10.

Figure 4:
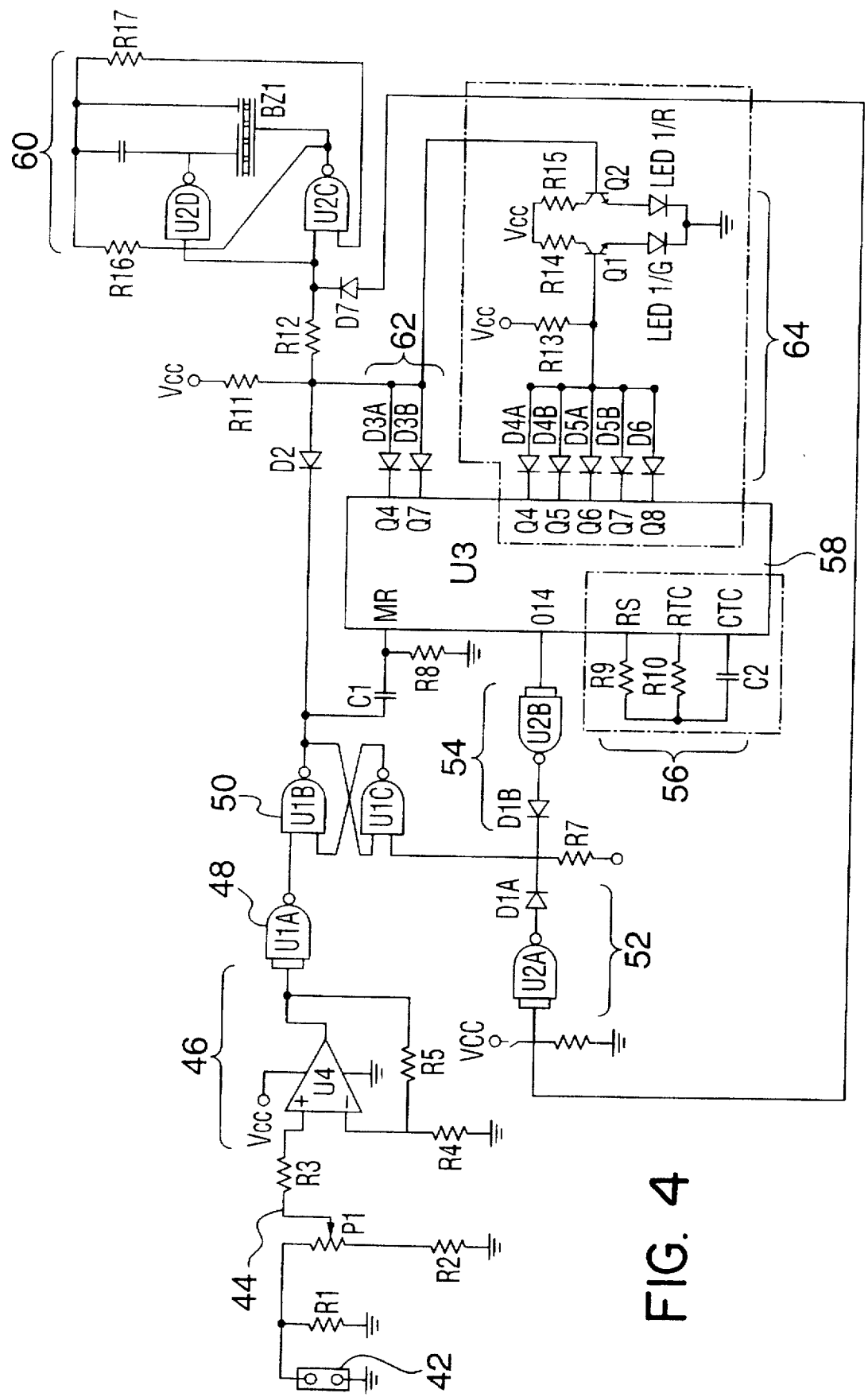
FIG. 4 is a schematic illustration of the electrical elements according to one embodiment of the present invention.

Referring now to FIG. 4, an example of the circuitry employed in the apparatus 10 is shown in schematic representation. The apparatus provides a transducer circuit, broadly denoted by numeral 42 for detecting incoming signals. The incoming signals are filtered by a potentiometer circuit 44 encompassing resistors R1, R2 and potentiometer P1. The potentiometer circuit 44 allows adjustment of a selected frequency or frequencies to be introduced into the remaining circuitry. Once a signal has been selected, the same can be passed on to the amplification portion of the circuit, broadly embracing resistors R3, R4, R5 and UART chip 4 (U4 Voltage Source $V_{cc}$). The amplification circuit is broadly denoted by numeral 46. The amplified signal is passed on to a detector 48, the detector comprising a UART chip U1A. The detected signal is passed on to a logic circuit denoted by numeral 50 comprising a pair of linked UART chips U1B and U1C. The logic circuit compares the signal that is incoming with the natural harmonic frequency signal of the building and comparison is made to determine whether the incoming signal is below the predetermined natural frequency of the building. If the signal does exceed this latter amount, the result is the detonation of the alarm to be discussed hereinafter. A manual reset circuit is provided by the combination of the UART chip U2A and diode D1A, the reset circuit being denoted by numeral 52. Also provided is an automatic reset circuit comprising diode D1B and UART chip U28 and resistor R7. The auto reset circuit is denoted by numeral 54. Automatic reset of the system will occur when after two minutes of ringing of the alarm. Numeral 56 represents a conventional clock circuit comprising a capacitor C2 and resistors R9, R10. The circuit is designed to provide two minutes of ringing of the alarm. Clock circuit 56 is connected to the main counter chip 58, which acts as the main distribution system for the circuit. The entire arrangement is connected to chip 58. Numeral 60 broadly denotes a conventional buzzer or alarm circuit composed of resistors R16, R17, capacitor C3, UART chips U2D and U2C and piezo electric circuit BZ1 as well as diode D7. The buzzer is modulated by diodes D3A and D3B and together these form the modulation circuit 62 connected to main counter chip 58.

Numeral 64 represents an optional battery check circuit with low voltage detector lamps to indicate whether the system is operational. This is shown in chain line. The arrangement is provided with diodes D4A, D4B, D5A, D5B and D6 and resistors R13 through R15 as well as transistors Q1, Q2 and light emitting diodes 1/G and 1/R.

In alternate embodiments of the circuit, suitable integrated circuits which may be employed include MC14467PI, MC14468P, MC145010DW, all by Motorola, SD2 by Supertex and 5348 by Allegro Electronics. Other suitable examples will be appreciated by those skilled in the art.

In another embodiment, the clock circuit 56 associated with chip 58 may be removed as illustrated in chain line in FIG. 4.

With the present invention, it has been found that apparatus 10 can be mounted to any suitable point in the infrastructure of a building (not shown), for example a wall. This is useful with the present system since a comparison circuit is provided to determine whether an incoming signal is simply due to extraneous mechanical vibration such as that which would be encountered from aircraft, heavy traffic, internal vibration, etc. In this manner, once the natural predetermined frequency of the building is determined, this can be preset by the potentiometer circuit and therefore when an incoming signal is less than this frequency, the logic of the circuit, numeral 50 in FIG. 4, can then compare that incoming signal with the predetermined natural frequency of the structure to determine whether, in fact, the value is sufficient to actuate the alarm 60. In prior art devices, no such comparison circuit has been provided and further, the systems did not provide full electronic components, but rather relied upon electromechanical arrangements or straight forward mechanical arrangements, all of which are susceptible to temperature fluctuations, sensitivity limitations, etc. By incorporating all discrete electronic components in the apparatus of the present invention, no such limitations exist. This is particularly complemented by the fact that the circuit prevents false alarms and can, in fact, be set to "filter out" extraneous vibration to only result in passage of P-waves, the precursors of S-waves.

A particularly attractive advantage with the present arrangement is that the comparator logic circuit 50 is not continuously running for comparing ground vibration to P-wave vibration as is a chief limitation in the prior art arrangement. With the present invention, once a voltage reaches the threshold value between detector circuit 48 and logic circuit 50, then the arrangement is actuated. Accordingly, there is no continuous power drain with the current arrangement and this, of course, inherently leads to a more reliable and efficient circuit.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of detecting vibration signals from a stationary object, said signals being indicative of an earthquake, comprising the steps of:

providing an integrated circuit structural vibration detecting means for electronically detecting vibration signals in a structure responsive to vibration of a fixed substrate upon which said detecting means is mounted, said circuit further including a potentiometer circuit;

mounting said detecting means to said fixed structure;

determining the vibration signal of said structure;

presenting said potentiometer to said vibration signal of said structure;

intermittently comparing electronically with said integrated circuit any extraneous vibration signal different from said preset vibration signal of said structure and allowing passage of P-waves;

determining whether said extraneous signal is within a predetermined earthquake signal level indicative of P-waves;

detecting an earthquake signal; and actuating alarm means.

2. An electronic detector for detecting vibration signals of a stationary structure positioned on a substrate and discerning whether said signal is a P-wave signal, comprising:

a vibration detecting transducer for detecting vibration of said stationary structure;

an integrated circuit for detecting a predetermined vibration signal of said structure and an extraneous signal different from said vibration signal, said integrated circuit, comprising:

an integrated circuit amplifier means for amplifying said signal;

an integrated circuit comparator means for intermittently comparing an extraneous signal with said predetermined vibration signal of said structure to verify whether said extraneous signal is a P-wave signal;

a potentiometer signal adjustment means for adjusting said detector means to different vibration signals of a structure; and selectively actuable alarm means connected to said comparator means, said alarm means capable of actuation when said extraneous signal is indicative of a P-wave.

* * * * *